United States Patent
Chiles et al.

Patent Number: 5,488,975
Date of Patent: Feb. 6, 1996

[54] MULTIPLE LAYER FLEXIBLE HOSE CONSTRUCTION INCORPORATING GAS BARRIER

[75] Inventors: Daniel T. Chiles; Richard M. Chiles, both of Springfield, Mo.

[73] Assignee: Heatway Systems, Inc., Springfield, Mo.

[21] Appl. No.: 267,456

[22] Filed: Jun. 28, 1994

Related U.S. Application Data

[63] Continuation of Ser. No. 899,505, Jun. 16, 1992, abandoned.

[51] Int. Cl.⁶ .................................................. F16L 11/08
[52] U.S. Cl. ........................ 138/125; 138/124; 138/137
[58] Field of Search .................................. 138/124, 125, 138/126, 127, 137, 140

[56] References Cited

U.S. PATENT DOCUMENTS

| | | |
|---|---|---|
| 2,800,145 | 7/1957 | Peierls et al. |
| 4,212,327 | 7/1980 | Haren et al. |
| 4,510,974 | 4/1985 | Natori et al. |
| 4,601,928 | 7/1986 | van der Velden |
| 4,603,712 | 8/1986 | Krause |
| 4,614,208 | 9/1986 | Skarelius |
| 4,758,455 | 7/1988 | Campbell et al. |
| 4,759,388 | 7/1988 | Kiyama et al. |
| 4,762,589 | 8/1988 | Akiyama et al. |
| 4,779,673 | 10/1988 | Chiles et al. |
| 4,842,024 | 6/1989 | Palinchak |
| 4,881,576 | 11/1989 | Kitami et al. |
| 4,907,625 | 3/1990 | Ito et al. |
| 5,022,459 | 6/1991 | Chiles et al. |
| 5,052,444 | 10/1991 | Messerly et al. |
| 5,093,166 | 3/1992 | Nishimura |

*Primary Examiner*—James E. Bryant, III
*Attorney, Agent, or Firm*—Kokjer, Kircher, Bowman & Johnson

[57] ABSTRACT

A multiple layer hose which incorporates a gas barrier film and an elastomeric fill layer which is interposed between the gas barrier and a fiber mesh reinforcing layer. The fill layer isolates the gas barrier from the reinforcing fibers and fills the grid openings in the mesh to avoid pockets of trapped air in the hose wall.

9 Claims, 1 Drawing Sheet

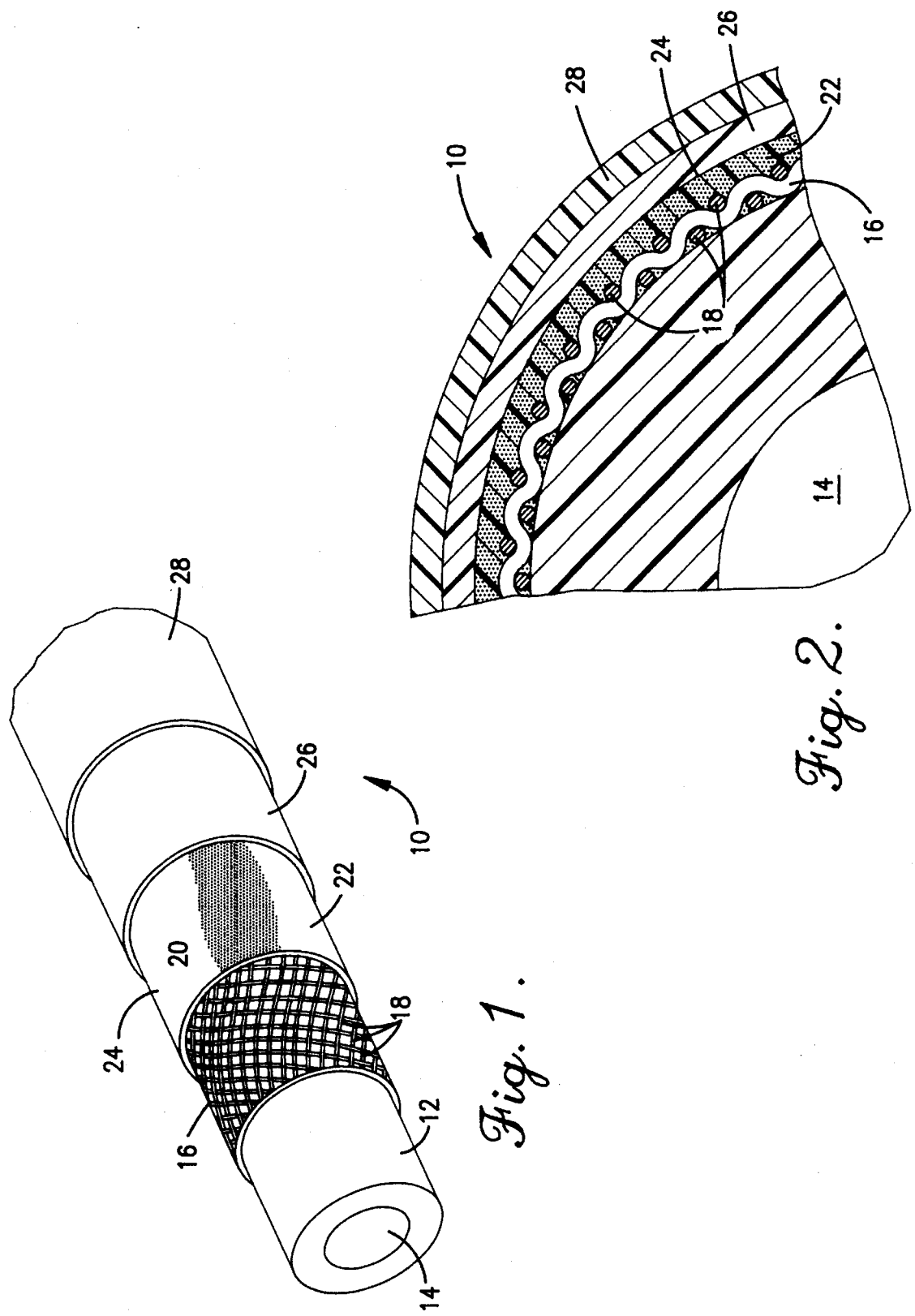

MULTIPLE LAYER FLEXIBLE HOSE CONSTRUCTION INCORPORATING GAS BARRIER

This is a continuation of application Ser. No. 07/899,505, filed Jun. 16, 1992, now abandoned.

FIELD OF THE INVENTION

This invention relates in general to laminated hoses and more particularly to a hose which is uniquely constructed to incorporate a gas barrier that effectively inhibits gas infiltration and exfiltration.

BACKGROUND OF THE INVENTION

As exemplified by U.S. Pat. Nos. 4,779,673 and 5,022,459 to Chiles et al., flexible hoses having a multiple layer construction have been used effectively in heat exchange applications such as heating of floors, ceilings, roofs and concrete or asphalt slabs. The hose is normally embedded in a surface which is to be heated by hot water pumped through the hose. The flexibility of a hose makes it much better in this type of application than rigid plastic or metal pipes because a hose can be bent or curved more sharply and more easily than a rigid pipe. Often, the conduit must be turned sharply to accommodate floor or roof framing, and a hose can be used in many applications where it is virtually impossible to use a rigid pipe because of its inability to accommodate sharp turns.

Hoses are also effective in other applications that involve the flow of heat exchange fluids. For example, hoses that accommodate cooling fluids in vehicles and hoses that convey refrigerants are widely used.

One of the principal problems with the hoses that have been used in the past is that they have been subject to gas infiltration and exfiltration that can cause problems. For example, oxygen passing through the hose wall from the outside to the inside can accelerate the aging of the hose and significantly shorten its useful life. Oxygen infiltration can also cause undue oxygenation of the fluid flowing in the hose and can cause corrosion of ferrous plumbing components. The hose layers are usually constructed of elastomeric or thermoplastic compounds, and the organic gases that may be present in these materials can migrate through the hose wall and cause unpleasant odors in the space that is being heated by the radiant hose heating system.

There are several plastic compounds that are known to be effective gas barriers. In order to allow the hose to retain the necessary flexibility, a plastic gas barrier must be thin enough to avoid adding undue rigidity to the hose. As a consequence, the gas barrier must be provided as a thin layer, and it must be incorporated inside hose wall so that it is protected by the abrasion resistant cover.

However, significant problems are encountered in incorporating a thin plastic film as a gas barrier inside of a hose wall. Normally, the hose has a tube, a mesh fiber reinforcing grid around the tube, and a protective outer cover around the reinforcement. If the plastic film is applied around the tube and then covered with the fiber mesh, the fibers can shrink and cut through the barrier film during processing. As can easily be appreciated, this reduces or destroys the ability of the barrier to inhibit gas infiltration and exfiltration.

Problems are also encountered if the gas barrier is applied around the reinforcing grid. The barrier layer can flow into the grid openings, and this decreases its thickness and its effectiveness as a barrier to gases. If the barrier lays wholly on the reinforcement, air is trapped in the pockets that are presented by the grid openings. This air can become saturated with liquid, and steam can be created and can burst through the outer layer of the hose during processing. Even if a problem this severe does not develop, the trapped air reduces the heat transfer rate through the hose and thus detracts from the efficiency of the heating system.

Another problem is that materials that are effective as gas barriers are typically ill suited for adherence to the layers that are inside and outside of them. For example, the gas barrier has difficulty adhering to reinforcing fibers of the type that are commonly used, including nylon, rayon, polyester and aramid products. If adhesion is poor, the layers of the hose can delaminate while in service and cause the hose to fail prematurely.

SUMMARY OF THE INVENTION

The present invention is directed to a multiple layer hose which incorporates a gas barrier film while overcoming the aforementioned problems. This is made possible by incorporating in the hose a "fill" layer between the fiber reinforcement and the gas barrier. The fill layer fills in the grid openings in the reinforcing mesh, provides a smooth surface for the gas barrier film, and exhibits good adhesive properties to maintain the adherence between the hose laminations.

In accordance with the invention, a multiple layer hose includes an interior layer in the form of a tube, a mesh reinforcing layer around the tube, a fill layer around the reinforcement, a gas barrier around the fill layer, and a protective cover around the gas barrier. The tube provides a flow channel for heated liquids. The reinforcement performs the function of reinforcing and strengthening the hose. The fill layer isolates the reinforcement from the gas barrier and fills the grid openings to eliminate air pockets and avoid damage to the barrier caused by the reinforcing mesh. The cover protects the interior components from damage caused by abrasion, chemicals and other outside influences.

It is a particularly important feature of the invention that the hose incorporates an effective gas barrier without sacrificing flexibility. At the same time, the structural integrity of the hose is enhanced by the fill layer because its ability to adhere to the reinforcement and the gas barrier prevents delamination and premature failure of the hose.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary perspective view of a multiple layer hose constructed according to a preferred embodiment of the present invention, with the various layers of the hose broken away for purposes of illustration; and FIG. 2 is a fragmentary sectional view on an enlarged scale taken through the hose shown in FIG. 1 to illustrate the layers incorporated in the hose.

DETAILED DESCRIPTION OF THE INVENTION

Referring now to the drawings in more detail, numeral 10 generally designates a multiple layer hose which incorporates a gas barrier in accordance with a preferred embodiment of the present invention. The hose 10 is particularly well suited for use in radiant heating systems of the type disclosed in U.S. Pat. No. 4,779,673 to Chiles et al. However, the hose is also well suited for use in other applications such as those which involve the handling of refrigerants and coolants.

The hose 10 has an inner layer which takes the form of a flexible tube 12 having a cylindrical shape. The tube 12 is hollow and provides inside of it a longitudinal flow passage 14 through which heated liquids or other fluids such as refrigerants can flow. The tube 12 should be constructed of a material which is able to withstand high temperatures and which is flexible so that it can be bent through sharp turns. By way of example, ethylene propylene diene monomer (EPDM), butadiene-styrene rubber (BSR), and neoprene all exhibit the necessary properties and may be employed in the construction of tube 12. The temperature resistive characteristics of the tube 12 should allow it to accommodate hot water in the flow passage 14 without undue deterioration or other damage to the tube.

Immediately outside of the tube 12, a reinforcing layer of fabric braid 16 is wound closely around the tube. The fabric braid 16 provides a reinforcing mesh constructed of a plurality of filaments or fibers 18 which are interwoven in a grid structure which presents generally square grid openings 20 between the fibers 18. The fabric braid 16 enhances the structural integrity of the hose 10 and increases its pressure and puncture resistance. Among the types of materials that may be used for the fibers 18 are rayon, nylon, aramid material or any type of suitable polyester thread.

Outside of the fabric braid reinforcement 16, a fill layer 22 is provided. The fill layer may be extruded over the reinforcing mesh 16, it may be wrapped over the reinforcing layer, or it may be otherwise applied to the reinforcement. The material of which the fill layer 22 is constructed should enable it to flow into and substantially fill the grid openings 20, as best shown in FIG. 2. At the same time, cylindrical surface 24 of the fill layer should be a smooth, cylindrical surface for a purpose that will be made clear. Various types of elastomeric compounds have been found to be suitable materials for the fill layer 22.

Applied around the fill layer 22 is a gas barrier which may take the form of a thin plastic film 26. The gas barrier film 26 should be constructed of a semi-flexible film that is substantially impermeable to oxygen and other gases. Preferably, ethylene vinyl alcohol (EVOH) is used for the film 26. Alternatively, an aluminum film or another suitable plastic film such as SARAN film may be used.

The film 26 may be extruded onto the fill layer 22. Alternatively, the gas barrier may take the form of a tape which is spirally wound on the fill layer 22. In any event, the gas barrier 26 is applied closely against the smooth outside surface 24 of the fill layer and is devoid of gaps or openings that could accommodate gas leakage.

The final layer of the hose 10 is a protective cover 28 which is extruded or otherwise applied over the gas barrier film 26. The cover 28 protects the interior components of the hose from abrasion and from adverse effects caused by chemicals such as solvents or cleaning fluids to which the hose may be exposed. Preferably, the cover 28 is in the form of a thin walled tube, and it may be constructed of materials such as chlorinated polyethylene (CPE), nitrile, nitrile-pvc, EPDM, neoprene, hypalon or chlorobutyl. The particular material that is selected should be chosen according to the environmental conditions the hose is expected to encounter in the particular application that is contemplated for its use.

Because of the relative inflexibility of appropriate gas barrier film 26, as compared to the flexible characteristics of rubber or elastomeric compounds, good adhesion of the barrier film 26 to the fill layer 22 and the protective cover 28 is essential. When a somewhat inflexible barrier is fully adhered on both surfaces to the relatively more flexible elastomeric surfaces, fill layer 22 and cover 28; the stress caused by the flexing of the hose construction is evenly communicated to the barrier film 26. This even stress distribution is essential to maintaining the integrity of the barrier film 26.

In the absence of the fill layer 22, the gas barrier film 26 may split open, or tear loose from the reinforcing mesh 16 when the hose construction is flexed.

A minor tear or split in the gas barrier film 26 is acceptable in the presence of a fully adhered fill layer 22 below the gas barrier film. However, if a tear or split takes place over the grid openings 20, in the absence of a fill layer; oxygen or other unacceptable gasses will rapidly diffuse through the reinforcing fabric mesh 16. This longitudinal gas movement largely negates any residual benefit from the remaining intact portion of the gas barrier film.

The hose 10 is constructed in a manner to present a unitary structure in which the different layers securely adhere to one another in order to prevent delamination. The materials which are used for the different layers of the hose may adhere to one another by reason of their properties. However, with some materials, it may be necessary to provide a suitable adhesive between the adjacent layers in order to achieve the desired adherence. In any case, the material of the fill layer 22 should substantially fill the grid openings 20 of the reinforcing mesh 16.

In use of the hose 10, hot water or another fluid is conveyed through the flow passage 14 while the hose is in service. Heat is able to pass through the hose wall to a slab or other structure in which the hose is embedded, thereby efficiently transferring heat from the interior of the hose to the structure which is heated by the hose. At the same time, the film 24 provides an effective gas barrier that prevents gases from infiltrating or exfiltrating through the hose wall. Oxygen is unable to pass into the hose and possibly cause degradation of the hose or corrosion of ferrous plumbing components that may be included in the heating system. Likewise, organic gases that may be present in the materials of which the hose is constructed cannot migrate through the wall of the hose and possibly cause unpleasant odors and other adverse conditions.

The provision of the fill layer 22 is a particularly important feature of the invention. The fill layer 22 physically isolates the gas barrier film 26 from the reinforcing braid 16. Without the presence of the fill layer 22, the film 26 could flow partially or wholly into the grid openings 22 and thus decrease the thickness of the film and reduce its effectiveness according. Direct physical contact between the gas barrier film 26 and the fibers 18 can cause the fibers to cut or abrade the film, thus possibly creating openings through which gases could leak. If the gas barrier were applied directly over the reinforcement 16, air can be trapped in the grid openings 20. These pockets of air can be saturated and can create steam which may burst through the outer layers of the hose during processing. Even if the trapped air does not burst completely through the hose, it reduces the heat transfer rate through the hose and thus detracts from the ability of the hose to heat the slab in which it is embedded. The fill layer 22 is able to flow into the grid openings 20 and fill them so that there are no voids presented which can trap air interiorly of the hose wall.

By using the multiple layer construction of the hose 10, the hose is able to perform its usual function while resisting infiltration and exfiltration of gases that can lead to problems. It is particularly important that the hose 10 retains flexibility and can be bent or curved through sharp turns in order to retain its advantages over rigid pipes. The fill layer 22 also adheres firmly to both the reinforcement layer and the gas barrier layer, thereby resisting delamination of the hose.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A flexible hose for transporting fluid, said hose comprising:

a flexible elastomeric tube presenting a fluid flow passage for accommodating flow of the fluid;

a protective cover constructed of a material resistant to abrasion, said cover being flexible and covering the tube;

a reinforcing layer including a grid constructed of a filament mesh disposed between said tube and said cover;

a flexible film disposed between said tube and said cover, said film providing a barrier to oxygen infiltration and escape and being at least as impervious to oxygen penetration as EVOH; and a fill layer between said filament mesh and said film to substantially isolate the film from the filament mesh.

2. A hose as set forth in claim 1, wherein the fill layer is applied to the outside of the reinforcing layer and said film is applied to the outside of the fill layer.

3. A hose as set forth in claim 2, wherein said fill layer presents a smooth outside surface to which said film is applied.

4. A hose as set forth in claim 3, wherein said grid presents grid openings between filaments of said mesh and said fill layer substantially fills said grid openings.

5. A hose as set forth in claim 1, wherein said grid presents grid openings between filaments of said mesh and said fill layer substantially fills said grid openings.

6. A hose as set forth in claim 5, wherein said fill layer comprises an elastomeric compound.

7. A hose as set forth in claim 1, wherein said fill layer comprises an elastomeric compound.

8. A flexible hose for transporting hot fluid, comprising:

a flexible tube constructed of a material able to withstand high temperatures and formed in a tubular shape to present a flow passage for the fluid to flow through;

a braided reinforcement mesh extending around said tube and constructed of fibers arranged in a grid presenting grid openings between fibers;

a fill layer applied to said reinforcement mesh in a manner to substantially fill said grid openings and presenting a smooth outer surface outwardly of said mesh;

an oxygen barrier film applied to said outer surface of the fill layer and resisting infiltration and exfiltration of oxygen, said film being at least as impervious to oxygen penetration as EVOH; and a protective cover covering said gas barrier film and constructed of an abrasion resistive material.

9. A hose as set forth in claim 8, wherein said fill layer comprises an elastomeric compound.

* * * * *